United States Patent
Abe et al.

(10) Patent No.: US 7,476,309 B2
(45) Date of Patent: Jan. 13, 2009

(54) TWO-STAGE HEAVY FEED HPC PROCESS

(75) Inventors: Satoshi Abe, Saijo (JP); Katsuhisa Fujita, Niihama (JP)

(73) Assignee: Albemarle Netherlands B.V., Amersfoort (NL)

( * ) Notice: Subject to any disclaimer, the term of this patent is extended or adjusted under 35 U.S.C. 154(b) by 546 days.

(21) Appl. No.: 10/480,176

(22) PCT Filed: Jun. 10, 2002

(86) PCT No.: PCT/EP02/06665

§ 371 (c)(1),
(2), (4) Date: May 21, 2004

(87) PCT Pub. No.: WO02/100980

PCT Pub. Date: Dec. 19, 2002

(65) Prior Publication Data

US 2004/0209771 A1   Oct. 21, 2004

(30) Foreign Application Priority Data

Jun. 8, 2001   (JP) .............................. 2001-174073

(51) Int. Cl.
    *C10G 45/04* (2006.01)
(52) U.S. Cl. ................... 208/210; 208/213; 208/216 R; 208/217; 208/216 PP; 208/59; 208/110; 502/313
(58) Field of Classification Search ................. 208/210, 208/213, 216 R, 217, 216 PP, 59, 110; 502/313
    See application file for complete search history.

(56) References Cited

U.S. PATENT DOCUMENTS

| | | | |
|---|---|---|---|
| 4,414,141 A * | 11/1983 | Schindler | 502/314 |
| 4,752,376 A | 6/1988 | Pachano et al. | 208/86 |
| 4,789,462 A | 12/1988 | Byrne et al. | 208/213 |
| 4,830,736 A | 5/1989 | Hung et al. | 208/251 |
| 5,100,855 A * | 3/1992 | Clark et al. | 502/211 |
| 5,525,211 A * | 6/1996 | Sudhakar et al. | 208/217 |
| 5,744,025 A | 4/1998 | Boon et al. | 208/253 |
| 6,270,654 B1 | 8/2001 | Colyar et al. | 208/57 |

OTHER PUBLICATIONS

Van Kervoort, et al., J. Inst. Pet., 37, *Determinatin of Dry-sludge Content of Fuel Oil: Development of the Shell Hot Filtration Test (SHFT)*, pp. 596-604 (1951).
Derwent Abstract of JP765055, dated Jul. 12, 1995.
Derwent Abstract of JP653875, dated Jun. 20, 1994.
Search Report of corresponding International Patent Application No. PCT/EP02/06665, dated Dec. 10, 2002.

* cited by examiner

*Primary Examiner*—Tam M Nguyen
(74) *Attorney, Agent, or Firm*—Jeremy J. Kliebert

(57) ABSTRACT

The present invention pertains to a method for hydroprocessing a heavy hydrocarbon oil, comprising bringing a heavy hydrocarbon oil into contact with hydroprocessing catalyst I in the presence of hydrogen in a first stage, after which the effluent of the first stage is contacted in whole or in part with hydroprocessing catalyst II in the presence of hydrogen in a second stage. The method according to the invention combines efficient contaminant removal with high cracking rate and low sediment formation. The invention also pertains to the combination of catalysts.

19 Claims, No Drawings

US 7,476,309 B2

TWO-STAGE HEAVY FEED HPC PROCESS

CROSS REFERENCE TO RELATED APPLICATIONS

This application claims priority from Japanese Patent Application No. 2001-174073, filed Jun. 8, 2001 and PCT Application PCT/EP02/06665, filed Jun. 10, 2002, the contents of which are incorporated herein in their entirety.

BACKGROUND OF THE INVENTION

1. Field of the Invention

The present invention relates to a method for hydroprocessing a heavy hydrocarbon oil, in particular a method in which a combination of two catalysts is used to obtain advantageous effects in the hydroprocessing of heavy hydrocarbon oils. The present invention also relates to a combination of catalysts suitable for use in such a process.

2. Prior Art

Japanese patent No. 765055 discloses a process for hydroprocessing a heavy hydrocarbon oil containing sulfur impurities and metallic impurities at least in two stages. In the first stage a catalyst containing 0.1 to 5 wt. % of metal oxide was used to effect hydrodemetallization and hydrocracking. In the second stage, a catalyst containing 7 to 30 wt. % of a metal oxide was used to effect hydrodesulfurization. However, due to, among other features, the high metals content of the second catalyst, asphaltene conversion in this process is not adequate.

Japanese patent No. 8325580 A discloses a catalytic hydroconversion method for a heavy feedstock. In the first stage a catalyst with a carrier material selected from alumina, silica, and a combination thereof which comprises 2 to 25 wt. % of oxides of active metals selected from cadmium, chromium, cobalt, iron, molybdenum, nickel, tin, tungsten or a combination thereof, is applied at a reaction temperature of 438 to 468° C., a hydrogen partial pressure of 105 to 245 kg/cm$^2$, and a volume hourly space velocity of 0.3 to 1.0 h-1. In the second stage a similar catalyst is used at a reaction temperature of 371 to 427° C., a hydrogen partial pressure of 105 to 245 kg/cm$^2$, and a space velocity of 0.1 to 0.8 h-1. The first stage is operated at a higher temperature and a lower catalytic activity than the second stage to improve hydroconversion.

However, it appears that the high temperature applied in the first stage leads to thermal condensation of asphaltene on the one hand and, on the other, the petroleum resin fractions produced with the thermal cracking of oil are unstable. This can lead to undesired cohesion and precipitation of asphaltene and coke formation in the second stage.

Japanese patent publication 653875 describes a multistage catalytic method for the high conversion of a heavy hydrocarbon liquid feedstock. In the first stage, a fixed bed or ebullated bed reactor is operated at a reaction temperature of 415 to 455° C., a hydrogen partial pressure of 70 to 211 kg/cm$^2$, and a space velocity of 0.2 to 2.0 h-1. In the second stage, an ebullated bed reactor is operated under similar conditions. The catalyst used in the above method comprises a carrier material selected from alumina, silica, and a combination thereof, and the oxide of an active metal selected from cadmium, chromium, cobalt, iron, molybdenum, nickel, tin, tungsten, and mixtures thereof. In this reference, vacuum bottoms are recirculated to achieve a high cracking rate, but the problem of asphaltene cohesion accompanying the high cracking rate operation is not solved.

In summary, the processes of the prior art are inadequate in inhibiting sediment formation in the hydroprocessing of heavy oil to effect hydrodesulfurization and conversions.

SUMMARY OF THE INVENTION

In one embodiment, the present invention comprises a method for hydroprocessing a heavy hydrocarbon oil, comprising bringing a heavy hydrocarbon oil into contact with hydroprocessing catalyst I in the presence of hydrogen in a first stage, after which the effluent of the first stage is contacted in whole or in part with hydroprocessing catalyst II in the presence of hydrogen in a second stage. Catalyst I comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier. The catalyst havs a specific surface area of at least 100 m$^2$/g, a total pore volume of at least 0.55 ml/g, at least 50% of the total pore volume in pores with a diameter of at least 20 nm (200 Å), and 10-30% of the total pore volume in pores with a diameter of at least 200 nm (2000 Å), Catalyst II comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier. The catalyst havs a specific surface area of at least 100 m$^2$/g, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

In a second embodiment, the present invention comprises a combination of catalysts comprising Catalysts I and II. Catalyst I comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier. Catalyst I has a specific surface area of at least 100 m$^2$/g, a total pore volume of at least 0.55 ml/g, at least 50% of the total pore volume in pores with a diameter of at least 20 nm (200 Å), and 10-30% of the total pore volume in pores with a diameter of at least 200 nm (2000 Å). Catalyst II comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier. Catalyst II has a specific surface area of at least 100 m$^2$ µg, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

Other embodiments of the invention encompass details concerning process conditions and catalyst compositions, all of which will be hereinafter discussed.

DETAILED DESCRIPTION OF THE INVENTION

The present invention relates to a process suitable for the hydroprocessing of heavy hydrocarbon oils containing a large amount of impurities such as sulfur, metals, and asphaltene to effect hydrodesulfurization (HDS), hydrodemetallization (HDM), asphaltene reduction (HDAsp) and/or conversion into lighter products, while limiting the amount of sediment produced. The feed may also contain other contaminants such as Conradson carbon residue (CCR) and nitrogen, and carbon residue reduction (HDCCR) and hydrodenitrification (HDN) may also be desired processes.

Hydrocarbon oils containing 50 wt. % or more of components with a boiling point of 538° C. or higher are called heavy hydrocarbon oils. These include atmospheric residue (AR) and vacuum residue (VR), which are produced in petroleum refining. It is desired to remove impurities such as sulfur from these heavy hydrocarbon oils by hydroprocessing, and to convert them into lighter oils, which have a higher economic value.

The hydroprocessing of heavy hydrocarbon oils is done in ebullating bed operation or in fixed bed operation.

For ebullating bed operation, various catalysts have been proposed. Generally, these catalysts are capable of efficiently removing sulfur, Conradson carbon residue (CCR), various metals, nitrogen and/or asphaltenes. However, it was found that the decomposition of asphaltenes, an aggregate of condensed aromatic compounds which is in good balance with the rest of the feedstock, is generally accompanied by the formation of sediment and sludge.

Sediment can be determined by the Shell hot filtration solid test (SHFST). (see Van Kerknoort et al., *J. Inst. Pet.*, 37, pp. 596-604 (1951)). Its ordinary content is said to be about 0.19 to 1 wt. % in product with a boiling point of 340° C. or higher collected from the bottom of a flash drum.

Sediment formed during hydroprocessing operations may settle and deposit in such apparatuses as heat exchangers and reactors, and because it threatens to close off the passage, it can seriously hamper the operation of these apparatuses. Especially in the hydroprocessing of heavy hydrocarbon feeds containing large amounts of vacuum residue, sediment formation is an important factor, and there is therefore need for a process for effecting efficient contaminant removal in combination with low sediment formation and high conversion.

The object of this invention is to provide an effective process for the hydroprocessing of a heavy hydrocarbon oil containing a large amount of impurities such as sulfur, Conradson carbon residue, metals, nitrogen, and asphaltene, especially a heavy oil containing 80% or more vacuum residue fractions, for adequately removing the impurities. In addition to efficient contaminant removal, the process should show low sediment formation, high asphaltene removal, and high conversion.

The inventors have found a catalytic hydroprocessing method for a heavy oil based on two-stage catalytic cracking, in which both catalysts meet specific requirements as to metals content and pore size distribution. The catalyst used in the first stage is specifically designed to decrease the impurities in the heavy hydrocarbon oil. In particular, it achieves demetallisation and efficient asphaltene removal, which is effective in preventing asphaltene precipitation.

The second stage catalyst is tailored to effect advanced desulfurisation and hydrogenation reactions while inhibiting sediment formation due to asphaltene precipitation, to allow stable operation.

The combination of the two different catalysts leads to a synergistic effect resulting in a process showing stable operation, high hydrodesulfurization and conversion activity, and low sediment formation.

The process according to the invention is a method for hydroprocessing a heavy hydrocarbon oil, comprising bringing a heavy hydrocarbon oil into contact with hydroprocessing catalyst I in the presence of hydrogen in a first stage, after which the effluent of the first stage is contacted in whole or in part with hydroprocessing catalyst II in the presence of hydrogen, wherein catalyst I comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of at least 100 $m^2/g$, a total pore volume of at least 0.55 ml/g, at least 50% of the total pore volume in pores with a diameter of at least 20 nm (200 Å), and 10-30% of the total pore volume in pores with a diameter of at least 200 nm (2000 Å) and catalyst II comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of at least 100 $m^2/g$, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

The present invention also pertains to a catalyst combination suitable for use in such a process, wherein the catalyst combination comprises catalysts I and II defined above.

The catalysts used in the process according to the invention comprise catalytic materials on a porous carrier. The catalytic materials present on the catalyst according to the invention comprise a Group VIB metal and a Group VIII metal of the Periodic Table of Elements applied by Chemical Abstract Services (CAS system). The Group VIII metal used in this invention is at least one selected from nickel, cobalt, and iron. In view of performance and economy, cobalt and nickel are preferred. Nickel is especially preferred. As the Group VIB metals which can be used, molybdenum, tungsten, and chromium may be mentioned, but in view of performance and economy, molybdenum is preferred. The combination of molybdenum and nickel is particularly preferred for the catalytic materials of the catalyst according to the invention.

Based on the weight (100 wt. %) of the final catalyst, the amounts of the respective catalytic materials in the catalysts used in the process according to the invention are as follows.

The catalysts comprise 7-20 wt. %, preferably 8-16 wt. %, of Group VIB metal, calculated as trioxide. If less than 7 wt. % is used, the activity of the catalyst will be insufficient. On the other hand, if more than 16 wt. %, in particular more than 20 wt. % is used, the catalytic performance will not be improved further.

The catalysts comprise 0.5-6 wt. %, preferably 1-5 wt. %, of Group VIII metal, calculated as oxide. If the amount is less than 0.5 wt. %, the activity of the catalysts will be too low. If more than 6 wt. % is present, the catalyst performance will not be improved further.

The total pore volume of Catalyst I and Catalyst II is at least 0.55 ml/g, preferably at least 0.6 ml/g. It is preferred if it is at most 1.0 ml/g, more preferably at most 0.9 ml/g. The determination of the total pore volume and the pore size distribution is effected via mercury penetration at a contact angle of 140° with a surface tension of 480 dynes/cm, using, for example, a mercury porosimeter Autopore II (trade name) produced by Micrometrics.

Catalyst I has a specific surface area of at least 100 $m^2/g$. For the catalyst to meet the required pore size distribution ranges, it is preferred for it to have a surface area of 100-180 m²/g, preferably 150-170 m²/g. If the surface area is less than 100 m²/g, the catalytic activity will be too low. In the present specification the surface area is determined in accordance with the BET method based on N₂ adsorption.

Catalyst I has at least 50% of the total pore volume in pores with a diameter of at least 20 nm (200 Å), preferably at least 60%. The percentage of pore volume in this range is preferably at most 80%. If the percentage of pore volume in this range is below 50%, the catalytic performance, especially the asphaltene cracking activity, will decrease. As a result thereof, sediment formation will increase. The carrier of catalyst I preferably shows at least 43% of pore volume in this range, more preferably at least 47%. The percentage of pore volume in this range for the carrier preferably is at most 75%, more preferably at most 70%.

Catalyst I has 10-30% of the total pore volume in pores with a diameter of at least 200 nm (2000 Å). If the percentage of pores in this range is too low, the asphaltene removal capacity in the bottom of the reactor will decrease, therewith increasing sediment formation. If the percentage of pores in this range is too high, the mechanical strength of the catalyst will decrease, possibly to a value which may be unacceptable for commercial operation.

Especially when the feedstock contains a large amount of vacuum residue, that is, if the percentage of the feed boiling above 538° C. is at least 70%, more preferably at least 80%, it is preferred for Catalyst I to have a % PV(10-120 nm) (% PV(100-1200 Å)) of less than 85%, preferably less than 82%, still more preferably less than 80%. If the percentage of pore volume present in this range becomes too high, the percentage of pore volume in pores with a diameter above 200 nm (2000 Å) will decrease, and the residue cracking rate may be insufficient.

It is preferred for Catalyst I to have less than 0.2 ml/g of pore volume in pores with a diameter of 50-150 nm (500 to 1,500 Å). If more than 0.2 ml/g of pore volume is present in this range, the relative percentage of pore volume present in pores with a diameter below 30 nm (300 Å) will decrease, and the catalytic performance may decline. Additionally, since pores with a diameter below 30 nm (300 Å) are liable to closing by very heavy feedstock components, it is feared that the life of the catalyst may be shortened if the amount of pore volume present in this range is relatively too small.

Additionally, it is preferred for Catalyst I to have less than 25% of its pore volume in pores with a diameter of 10 nm (100 Å) or less. If the percentage of pore volume present in this range is above this value, sediment formation may increase due to increased hydrogenation of the non-asphaltenic feed constituents.

Catalyst I is based on a porous inorganic oxide carrier which generally comprises the conventional oxides, e.g., alumina, silica, silica-alumina, alumina with silica-alumina dispersed therein, silica-coated alumina, magnesia, zirconia, boria, and titania, as well as mixtures of these oxides. It is preferred for the carrier to consist for at least 80% of alumina, more preferably at least 90%, still more preferably at least 95%. A carrier consisting essentially of alumina is preferred, the wording "consisting essentially of" being intended to mean that minor amounts of other components may be present, as long as they do not affect the catalytic activity of the catalyst.

Catalyst II has a specific surface area of at least 100 m²/g, preferably at least 130 m²/g. If the surface area is below 100 m²/g, the catalytic activity will be insufficient.

Catalyst II will have at least 75% of the total pore volume in pores with a diameter of 10-120 nm (100-1200 Å), preferably at least 78%. If the percentage of pore volume in this range is insufficient, the hydrocracking and hydrodesulfurization activity of the catalyst will be insufficient. Catalyst II has 0-2% of the total pore volume in pores with a diameter of at least 400 nm (4000 Å), and 0-1% of the total pore volume in pores with a diameter of at least 1000 nm (10000 Å). If these requirements are not met, the stability of the hydrodesulfurization and hydrocracking activity of Catalyst II cannot be guaranteed. Additionally, it is preferred for Catalyst II to have less than 25% of its pore volume in pores with a diameter of 10 nm (100 Å) or less. If the percentage of pore volume present in this range is above this value, sediment formation may increase due to increased hydrogenation of the non-asphaltenic feed constituents.

Catalyst II is also based on a porous inorganic oxide carrier which generally comprises the conventional oxides, e.g., alumina, silica, silica-alumina, alumina with silica-alumina dispersed therein, silica-coated alumina, magnesia, zirconia, boria, and titania, as well as mixtures of these oxides. It is preferred for the carrier to consist for at least 70 wt. % of alumina, more preferably at least 88 wt. %, with the balance being made up of silica.

Two specific embodiments of catalyst II, which were found to be particularly suitable for use in the process according to the invention, have been developed.

The first specific embodiment, further indicated as Catalyst IIa, has a surface area of at least 100 m²/g. It is preferably between 100 and 180 m²/g, more preferably between 150 and 170 m²/g. It has at least 75% of the total pore volume in pores with a diameter of 10-120 nm (100-1200 Å), preferably at least 85%, more preferably at least 87%.

Catalyst IIa preferably is based on an alumina carrier. As the alumina carrier in this embodiment, a carrier consisting essentially of alumina is preferred, the wording "consisting essentially of" being intended to mean that minor amounts of other components may be present, as long as they do not affect the catalytic activity of the catalyst.

However, to improve catalyst strength as well as carrier acidity, the carrier can contain at least one material selected, for example, from oxides of silicon, titanium, zirconium, boron, zinc, phosphorus, alkali metals and alkaline earth metals, zeolite, and clay minerals in a small amount of less than 5 wt. %, based on the weight of the completed catalyst, preferably less than 2.5 wt. %, more preferably less than 1.5 wt. %, still more preferably less than 0.5 wt. %.

The second specific embodiment, further indicated as Catalyst IIb, has a surface area of at least 150 m²/g, preferably 185-250 m²/g. It has at least 75% of the total pore volume in pores with a diameter of 10-120 nm (100-1200 Å), preferably at least 78%.

Catalyst IIb is based on a carrier comprising at least 3.5 wt. % of silica, calculated on the weight of the final catalyst, preferably 3.5-30 wt. %, more preferably 4-12 wt. %, even more preferably 4.5-10 wt. %. If less than 3.5 wt. % of silica is present, the performance of the catalyst will be less pronounced. The balance of the carrier of catalyst IIb is generally made up of alumina, optionally containing other refractory oxides, such as titania, zirconia, etc. It is preferred that the balance of the carrier of catalyst IIb is made up of at least 90% of alumina, more preferably at least 95%. It is preferred for the carrier of the catalyst of the invention to consist essentially of silica and alumina, the wording "consists essentially of" being intended to mean that minor amounts of other components may be present, as long as they do not affect the catalytic activity of the catalyst. In a further preferred embodiment, Catalyst IIb comprises a Group IA metal component. Sodium and potassium may be mentioned as suitable materials. Sodium is preferred for reasons of performance and economy. The amount of Group IA metal is 0.1-2 wt. %, preferably 0.2-1 wt. %, more preferably 0.1-0.5 wt. %, calculated as oxide. If less than 0.1 wt. % is present, the desired effect will not be obtained. If more than 2 wt. %, is present, or sometimes more than 1 wt. %, the activity of the catalyst will be adversely affected.

In a particularly preferred embodiment, in the second stage a combination of catalysts IIa and IIb is used. If a mixture of catalyst IIa and catalyst IIb is used, it is preferred for catalyst IIa to have at least 50% of its pore volume in pores with a diameter above 200 Å, more preferably 60-80%, while for catalyst IIb it is preferred to have less than 50% of its pore volume present in pores with a diameter of above 200 Å, more preferably less than 40%.

If this requirement is met, catalyst IIa will show good asphaltene cracking properties and low sediment formation and catalyst IIb will show good hydrodesulfurization activity and good hydrogenation activity, and the combination will lead to very good results.

If a mixture of catalysts IIa and IIb is applied, the mixture has to comprise at least 1 wt. % of catalyst IIb, calculated on the total amount of catalysts IIa and IIb, preferably at least 10 wt. %. The mixture preferably comprises up to 50 wt. % of catalyst IIb, preferably up to 30 wt. %. If this requirement is met, the hydrogenation activity of the total amount of second stage catalyst will be well-balanced, and low sediment formation can easily be obtained.

The catalysts can be mixed in various ways. In fixed bed operation, the catalysts can be applied in separate layers, but the use of a more or less homogeneous mixture of the two catalysts is preferred. In ebullating bed operation, catalyst is continuously added to and withdrawn from the unit. There, a catalyst mixture can be applied, but it is also possible to start by using catalyst IIa and gradually replacing it with catalyst IIb.

If so desired, any of the catalysts may contain additional components conventionally used in hydroprocessing catalysts, including, for example, compounds of Group IA (e.g., sodium, lithium, potassium), compounds of Group IIA (e.g., magnesium, calcium), compounds of Group IIIA (e.g., boron), compounds of Group IVA (e.g., tin, lead), and compounds of Group VB (e.g., phosphorus, arsenic, antimony, etc).

More in particular, if in the second stage the combination of catalysts IIa and IIb is used, it is preferred for catalyst IIb to comprise a compound of Group VA, namely phosphorus, arsenic, antimony, and bismuth. Phosphorus is preferred. The compound in this case preferably is present in an amount of 0.05-3 wt. %, more preferably 0.1-2 wt. %., still more preferably 0.1-1 wt. %, calculated as $P_2O_5$. As indicated above, it may also be preferred for catalyst IIb to comprise a compound of Group IA, e.g., sodium, potassium, or lithium.

On the other hand, if in the second stage catalyst IIb is used by itself, that is, not in combination with catalyst IIa, it is preferred for catalyst IIb to be free from phosphorus.

The catalyst particles can have the shapes and dimensions common to the art. Thus, the particles may be spherical, cylindrical, or polylobal and their diameter may range from 0.5 to 10 mm. Particles with a diameter of 0.5-3 mm, preferably 0.7-1.2 mm, for example 0.9-1 mm, and a length of 2-10 mm, for example 2.5-4.5 mm, are preferred. For use in fixed bed operation polylobal particles are preferred, because they lead to a reduced pressure drop in hydrodemetallization operations. Cylindrical particles are preferred for use in ebullating bed operations.

The carrier to be used in the catalysts to be used in the process according to the invention can be prepared by processes known in the art. A typical production method for a carrier comprising alumina is coprecipitation of sodium aluminate and aluminum sulfate. The resulting gel is dried, extruded, and calcined, to obtain an alumina-containing carrier. Optionally, other components such as silica may be added before, during, or after precipitation.

By way of example, a process for preparing an alumina gel will be described below. First, a tank containing tap water or warm water is charged with an alkali solution of sodium aluminate, aluminum hydroxide or sodium hydroxide, etc., and an acidic aluminum solution of aluminum sulfate or aluminum nitrate, etc. is added for mixing.

The hydrogen ion concentration (pH) of the mixed solution changes with the progression of the reaction. It is preferable that when the addition of the acidic aluminum solution is completed, the pH is 7 to 9, and that during mixing, the temperature is 60 to 75° C. The mixture is then kept at that temperature for, in general, 0.5-1.5 hours, preferably for 40-80 minutes.

By way of a further example, a process for preparing a silica-containing alumina gel is described below. First, an alkali solution such as sodium aluminate, ammonium hydroxide or sodium hydroxide is fed into a tank containing tap water or hot water, and an acid solution of an aluminum source, e.g., aluminum sulfate or aluminum nitrate, is added, and the resulting mixture is mixed. The pH of the mixture changes as the reaction progresses. Preferably, after all the acid aluminum compound solution has been added, the pH is 7 to 9. After completion of the mixing an alumina hydrogel can be obtained. Then, an alkali metal silicate such as a water glass or an organic silica solution is added as silica source. To mix the silica source, it can be fed into the tank together with the acid aluminum compound solution or after the aluminum hydrogel has been produced.

The silica-containing alumina carrier can, for another example, be produced by combining a silica source such as sodium silicate with an alumina source such as sodium aluminate or aluminum sulfate, or by mixing an alumina gel with a silica gel, followed by moulding, drying, and calcining. The carrier can also be produced by causing alumina to precipitate in the presence of silica in order to form an aggregate mixture of silica and alumina. Examples of such methods are adding a sodium aluminate solution to a silica hydrogel and increasing the pH by the addition of, e.g., sodium hydroxide to precipitate alumina, and coprecipitating sodium silicate with aluminum sulfate. A further possibility is to immerse the alumina carrier, before or after calcination, in an impregnation solution comprising a silicon source dissolved therein.

In a following stage, the gel is separated from the solution and a commercially used washing treatment, for example a washing treatment using tap water or hot water, is carried out to remove impurities, mainly salts, from the gel.

Then, the gel is shaped into particles in a manner known in the art, e.g., by way of extrusion, beading or pelletizing.

Finally, the shaped particles are dried and calcined. The drying is generally carried out at a temperature from room temperature up to 200° C., generally in the presence of air. The calcining is generally carried out at a temperature of 300 to 950° C., preferably 600 to 900° C., generally in the presence of air, for a period of 30 minutes to six hours. If so desired, the calcination may be carried out in the presence of steam to influence the crystal growth in the oxide.

By the above production method it is possible to obtain a carrier having properties which will give a catalyst with the surface area, pore volume, and pore size distribution characteristics specified above. The surface area, pore volume, and pore size distribution characteristics can be adjusted in a manner known to the skilled person, for example by the addition during the mixing or shaping stage of an acid, such as nitric acid, acetic acid or formic acid, or other compounds as moulding auxiliary, or by regulating the water content of the gel by adding or removing water.

The carriers of the catalysts to be used in the process according to the invention have a specific surface area, pore volume, and pore size distribution of the same order as those of the catalysts themselves. The carrier of catalyst I preferably has a surface area of 100-200 m$^2$/g, more preferably 130-170 m$^2$/g. The total pore volume is preferably 0.5-1.2 ml/g, more preferably 0.7-1.1 ml/g. The carrier of catalyst II preferably has a surface area of 180-300 m$^2$/g, more preferably 185-250 m$^2$/g, and a pore volume of 0.5-1.0 ml/g, more preferably 0.6-0.9 ml/g.

The Group VIB metal components, Group VIII metal components, and, where appropriate, Group IA metal components can be incorporated into the catalyst carrier in a conventional manner, e.g., by impregnation and/or by incorporation into the support material before it is shaped into particles.

At this point in time it is considered preferred to first prepare the carrier and incorporate the catalytic materials into the carrier after it has been dried and calcined. The metal components can be incorporated into the catalyst composition in the form of suitable precursors, preferably by impregnating the catalyst with an acidic or basic impregnation solution comprising suitable metal precursors. For the Group VIB metals, ammonium heptamolybdate, ammonium dimolybdate, and ammonium tungstenate may be mentioned as suitable precursors. Other compounds, such as oxides, hydroxides, carbonates, nitrates, chlorides, and organic acid salts, may also be used. For the Group VIII metals, suitable precursors include oxides, hydroxides, carbonates, nitrates, chlorides, and organic acid salts. Carbonates and nitrates are particularly suitable. Suitable Group IA metal precursors include nitrates and carbonates.

The impregnation solution, if applied, may contain other compounds the use of which is known in the art, such as organic acids, e.g., citric acid, ammonia water, hydrogen peroxide water, gluconic acid, tartaric acid, malic acid or EDTA (ethylenediamine tetraacetic acid). It will be clear to the skilled person that there is a wide range of variations on this method. Thus, it is possible to apply a plurality of impregnating stages, the impregnating solutions to be used containing one or more of the component precursors that are to be deposited, or a portion thereof. Instead of impregnating techniques, dipping methods, spraying methods, etc. can be used. In the case of multiple impregnation, dipping, etc., drying and/or calcining may be carried out in between.

After the metals have been incorporated into the catalyst composition, it is optionally dried, e.g., in air flow for about 0.5 to 16 hours at a temperature between room temperature and 200° C., and subsequently calcined, generally in air, for about 1 to 6 hours, preferably 1-3 hours at 200-800° C., preferably 450-600° C. The drying is done to physically remove the deposited water. The calcining is done to bring at least part, preferably all, of the metal component precursors to the oxide form.

It may be desirable to convert the catalyst, i.e., the Group VIB and Group VIII metal components present therein, into the sulfidic form prior to its use in the hydroprocessing of hydrocarbon feedstocks. This can be done in an otherwise conventional manner, e.g., by contacting the catalyst in the reactor at increasing temperature with hydrogen and a sulfur-containing feedstock, or with a mixture of hydrogen and hydrogen sulfide. Ex situ presulfiding is also possible.

The process of the present invention is particularly suitable for the hydroprocessing of heavy hydrocarbon feeds. It is particularly suitable for hydroprocessing heavy feedstocks of which at least 50 wt. %, preferably at least 80 wt. %, boils above 538° C. (1000° F.) and which comprise at least 2 wt. % of sulfur and at least 5 wt. % of Conradson carbon. The sulfur content of the feedstock may be above 3 wt. %. Its Conradson carbon content may be above 8 wt. %, preferably above 10 wt. %. The feedstock may contain contaminant metals, such as nickel and vanadium. Typically, these metals are present in an amount of at least 20 wtppm, calculated on the total of Ni and V, more particularly in an amount of at least 30 wtppm.

Suitable feedstocks include atmospheric residue, vacuum residue, residues blended with gas oils, particularly vacuum gas oils, crudes, shale oils, tar sand oils, solvent deasphalted oil, coal liquefied oil, etc. Typically they are atmospheric residue (AR), vacuum residue (VR), and mixtures thereof.

Each stage of the process according to the invention can be carried out in a fixed bed, in a moving bed, or in an ebullated bed. It is preferred to carry out at least one stage in an ebullating bed. Carrying out both stages in an ebullating bed is preferred.

The two stages of the process according to the invention can be carried out in a single reactor, or in separate reactors. If the process is an ebullating bed process, the use of separate reactors for the two stages is preferred. If so desired, one may perform one or more of intermediate phase separation, stripping, H$_2$ quenching, etc. between the two stages.

The process conditions for the process according to the invention may be as follows. The temperature generally is 350-450° C., preferably 400-440° C. The pressure generally is 5-25 MPA, preferably 14-19 MPA. The liquid hourly space velocity generally is 0.1-3 h-1, preferably 0.3-2 h-1. The hydrogen to feed ratio generally is 300-1,500 Nl/l, preferably 600-1000 Nl/l. The process is carried out in the liquid phase.

The invention will be elucidated below by way of the following examples, though it must not be deemed limited thereto or thereby.

EXAMPLE 1

Preparation of Catalyst A

A sodium aluminate solution and an aluminum sulfate solution were simultaneously added dropwise to a tank containing tap water, mixed at pH 8.5 at 77° C., and held for 70 minutes. The thus produced alumina hydrate gel was separated from the solution and washed with warm water, to remove the impurities in the gel. Then, the gel was kneaded for about 20 minutes and extruded as cylindrical particles having a diameter of 0.9 to 1 mm and a length of 3.5 mm. The extruded alumina particles were calcined at 800° C. for 2 hours, to obtain an alumina carrier.

100 g of the alumina carrier obtained as described above were immersed in 100 ml of a citric acid solution containing 17.5 g of ammonium molybdate tetrahydrate and 9.8 g of nickel nitrate hexahydrate at 25° C. for 45 minutes, to obtain a carrier loaded with metallic components.

Subsequently the loaded carrier was dried at 120° C. for 30 minutes and calcined at 620° C. for 1.5 hours, to complete a catalyst. The amounts of the respective components in the produced catalyst and the properties of the catalyst are shown in Table 1. Catalyst A meets the requirements of Catalyst I of the present invention.

Preparation of Catalyst B

The preparation of Catalyst A was repeated, except for the following modifications: In the carrier preparation, the temperature during the alumina gel formation was 65° C. The carrier calcination temperature was 900° C. In the catalyst preparation the impregnation solution contained 16.4 g of ammonium molybdate tetrahydrate, and the catalyst calcination temperature was 600° C. The composition and properties of Catalyst B are given in Table 1. Catalyst B meets the requirements of Catalyst II of the present invention.

Preparation of Catalyst C

To produce a silica-alumina carrier, a sodium aluminate solution was supplied to a tank containing tap water, and an aluminum sulfate solution and a sodium silicate solution were added and mixed. When the addition of the aluminum sulfate solution was completed, the mixture had a pH of 8.5. The mixture was kept at 64° C. for 1.5 hours. By such mixing a silica-alumina gel was produced. The sodium silicate concentration was set at 1.6 wt. % of the alumina gel solution.

The silica-alumina gel was isolated by filtration and washed with hot water to remove impurities from the gel. It was then extruded into cylindrical grains with a diameter of 0.9-1 mm and a length of 3.5 mm. The resulting particles were dried in air at a temperature of 120° C. for 16 hours and subsequently calcined in the presence of air for two hours at 800° C. to obtain a silica-alumina carrier. The silica-content of the obtained carrier was 7 wt. %. One hundred grams of the thus obtained silica-alumina carrier were impregnated with 100 ml of an impregnation solution containing 16.4 g of ammonium molybdate tetrahydrate, 9.8 g of nickel nitrate hexahydrate, 0.66 g of sodium nitrate, and 50 ml of 25% ammonia water. The impregnated carrier was then dried at a temperature of 120° C. for 30 minutes and calcined in a kiln for 1.5 hours at 540° C. to produce a final catalyst. The composition and properties of this catalyst are given in Table 1. Catalyst C meets the requirements of Catalyst II of the present invention.

Preparation of Catalyst D

A sodium aluminate solution and an aluminum sulfate solution were simultaneously added dropwise to a tank containing tap water, mixed at pH 7.5 at 70° C. Sodium aluminate was then added until a final pH of 9.5 was reached, when the mixture was held for 70 minutes. The thus produced alumina hydrate gel was converted into a carrier in the same way as described for the carrier of Catalyst B. The carrier was converted into a catalyst as described for Catalyst B, except that the impregnation solution contained 17.2 g ammonium molybdate tetrahydrate. The composition and properties of Catalyst D are given in Table 1.

Preparation of Catalyst E

A large-pore carrier was prepared by grinding some of the calcined carrier material of catalyst D, mixing it with alumina gel prepared as described for Catalyst D, and converting the mixture into a carrier as described for Catalyst B.

The carrier was converted into a catalyst as described for Catalyst B, except that the impregnation solution contained 17.2 g ammonium molybdate tetrahydrate. The composition and properties of Catalyst E are given in Table 1.

TABLE 1

Catalyst composition and properties

| Catalyst | Catalyst A | Catalyst B | Catalyst C |
|---|---|---|---|
| carrier | alumina | alumina | Al2O3 + 6% SiO2 |
| Group VIB wt. % ox | 13.1 | 11.9 | 11.5 |
| Group VIII wt. % ox | 2.0 | 2.0 | 2.1 |
| Group IA wt. % ox | 0 | 0 | 0.2 |
| surface area m$^2$/g | 161 | 147 | 214 |
| total pore volume ml/g | 0.88 | 0.79 | 0.75 |
| % PV(>200 Å) | 63 | 74 | 25 |
| % PV(>2000 Å) | 24 | 1 | 1 |
| % PV(>10000 Å) | 0.1 | 0 | 0 |
| % PV(100-1200 Å) | 74 | 89 | 80 |
| % PV(>4000 Å) | 16 | 1 | 0.3 |
| % PV(<100 Å) | 0.4 | 0.4 | 14 |

| Catalyst | Catalyst D | Catalyst E |
|---|---|---|
| carrier | alumina | alumina |
| Group VIB wt. % ox | 13.3 | 13.0 |
| Group VIII wt. % ox | 2.1 | 2.2 |
| Group IA wt. % ox | 0 | 0 |
| surface area m$^2$g | 168 | 125 |
| total pore volume ml/g | 0.72 | 0.80 |
| % PV(>200 Å) | 35 | 30 |
| % PV(>2000 Å) | 12 | 35 |
| % PV(>10000 Å) | 0.5 | 3.5 |
| % PV(100-1200 Å) | 68 | 55 |
| % PV(>4000 Å) | 1.4 | 18 |
| % PV(<100 Å) | 0.4 | 0.6 |

Catalysts A through E were tested in various combinations in the two-stage hydroprocessing of a heavy hydrocarbon feedstock. The feedstock used in these examples was a Middle East petroleum consisting of 90 wt. % of vacuum residue (VR) and 10 wt. % of atmospheric residue (AR). The composition and properties of the feed are given in Table 2.

TABLE 2

Feedstock composition
Middle East petroleum (VR:AR = 90:10)

| | |
|---|---|
| Sulfur (wt. %) | 4.9 |
| Nitrogen (wppm) | 3300 |
| Metals—vanadium (wppm) | 109 |
| Metals—nickel (wppm) | 46 |
| Conradson Carbon residue (wt. %) | 22.5 |
| C7—insolubles[1] (wt. %) | 8.0 |
| Vacuum residue[2] (wt. %) | 93 |
| Density (g/ml at 15° C.) | 1.0298 |

[1]Asphaltene fraction—matter insoluble in n-heptane
[2]Fraction boiling above 538° C. in accordance with ASTM D 5307 (distillation gas chromatography)

Catalysts A through E were packed into a fixed bed reactor in two catalyst beds in the combinations given in Table 3 below. The two catalyst beds contained equal volume amounts of catalyst.

The feedstock was introduced into the unit in the liquid phase at a liquid hourly space velocity of 1.5 h-1, a pressure of 16.0 MPa, an average temperature of 427° C., with the ratio of supplied hydrogen to feedstock (H$_2$/oil) being kept at 800 Nl/l.

The oil product produced by this process was collected and analyzed to calculate the amounts of sulfur (S), metals (vanadium+nickel) (M), and asphaltene (Asp) removed by the process, as well as the 538° C.+fraction. The relative volume activity values were obtained from the following formulae.

$RVA=100*k$(tested catalyst combination)/$k$(comparative catalyst combination 2)

wherein for HDS $k=(LHSV/(0.7))*(1/y^{0.7}-1/x^{0.7})$ and for HDM and asphaltene removal $$k = LHSV * \ln(x/y)$$

with x being the content of S, M, or Asp in the feedstock, and y being the content of S, M, or Asp in the product.

Table 3 below gives the tested catalyst combinations and the results obtained.

TABLE 3

|  | C. 1 | C. 2 | C. C. 1 | C. C. 2 | C. C. 3 | C. C. 4 |
|---|---|---|---|---|---|---|
| Catalyst I | A | A | A | B | C | A |
| Catalyst II | B | C | A | B | C | D |
| RVA HDS | 106 | 116 | 102 | 100 | 129 | 101 |
| RVA HDM | 117 | 106 | 115 | 100 | 86 | 92 |
| RVA Asp | 119 | 109 | 116 | 100 | 72 | 91 |
| Cracking rate 538° C.+ fraction (residue) (wt. %) | 41 | 42 | 37 | 40 | 43 | 38 |
| Sediment (wt. %)[1] | 0.1 | 0.09 | 0.09 | 0.28 | 0.60 | 0.21 |

|  | C. C. 5 | C. C. 6 | C. C. 7 | C. C. 8 | C. C. 9 |
|---|---|---|---|---|---|
| Catalyst I | A | B | C | C | D |
| Catalyst II | E | C | D | E | E |
| RVA HDS | 89 | 103 | 106 | 98 | 88 |
| RVA HDM | 102 | 98 | 76 | 99 | 90 |
| RVA Asp | 100 | 93 | 75 | 99 | 95 |
| Cracking rate 538° C.+ fraction (residue) (wt. %) | 38 | 40 | 42 | 39 | 37 |
| Sediment (wt. %)[1] | 0.16 | 0.36 | 0.59 | 0.47 | 0.19 |

[1] Sediment determined in accordance with the IP 375 method of the English Institute of Petroleum As can be seen from Table 3, the catalyst combinations according to the invention show high activities in HDS, HDM, and asphaltene removal in combination with a high residue cracking rate and low sediment formation.

EXAMPLE 2

Preparation of Catalyst F

A silica-containing catalyst carrier was prepared as described for Catalyst C in Example 1.

One hundred grams of the thus obtained silica-alumina carrier were impregnated with 100 ml of an impregnation solution containing 16.2 g of ammonium molybdate tetrahydrate, 4.7 g of nickel carbonate, 0.66 g of sodium nitrate, and 2.1 g of orthophosphoric acid. The impregnated carrier was then dried at a temperature of 120° C. for 30 minutes and calcined in a kiln for 1.5 hours at 540° C. to produce a final catalyst. The composition and properties of this catalyst are given in Table 4. Catalyst F meets the requirements of Catalyst II of the present invention.

TABLE 4

| Catalyst | Catalyst F |
|---|---|
| Carrier | Al2O3 + 4% SiO2 (calculated on catalyst) |
| Group VIB wt. % ox | 11.6 |
| Group VIII wt. % ox | 2.1 |
| Group IA wt. % ox | 0.3 |
| P2O5 wt. % | 1.1 |
| surface area m2/g | 217 |

TABLE 4-continued

| Catalyst | Catalyst F |
|---|---|
| total pore volume ml/g | 0.78 |
| % PV(>200 Å) | 26 |
| % PV(>2000 Å) | 2 |
| % PV(>10000 Å) | 0 |
| % PV(100-1200 Å) | 78 |
| % PV(>4000 Å) | 0.2 |
| % PV(<100 Å) | 13 |

Catalyst F was tested in combination with Catalyst B as second Catalyst layer in the process according to the invention. The feed and process conditions were the same as those described in Example 1. Table 5 below gives the tested catalyst combinations and the results obtained.

TABLE 5

|  | C. 3 | C. 4 |
|---|---|---|
| Catalyst I | A | A |
| Catalyst II | B + F | B + F |
|  | 90:10 | 70:30 |
| RVA HDS | 119 | 122 |
| RVA HDM | 116 | 113 |
| RVA Asp | 110 | 108 |
| Cracking rate 538° C.+ fraction (residue) | 42 | 42 |
| Sediment[1] | 0.11 | 0.12 |

As can be seen from Table 5, the use of a combination of two catalysts in Catalyst bed II, wherein the second catalyst is made up of a catalyst based on an alumina carrier and a catalyst based upon a carrier containing alumina and silica, leads to high activities in HDS, HDM, and asphaltene removal in combination with a high residue cracking rate and low sediment formation.

The invention claimed is:

1. A method for hydroprocessing a heavy hydrocarbon oil, comprising bringing a heavy hydrocarbon oil having at least 70 wt % vacuum residue which boils above 538° C. into contact with hydroprocessing catalyst I in the presence of hydrogen in a first stage, after which the effluent of the first stage is contacted in whole or in part with hydroprocessing catalyst II in the presence of hydrogen in a second stage, wherein catalyst I comprises 7 to 20 wt. % of a Group VIB metal component, calculated as trioxide on the weight of the catalyst, and 0.5 to 6 wt. % of a Group VII metal component, calculated as oxide on the weight of the catalyst, on a porous inorganic carrier, said catalyst having a specific surface area of at least 100 m$^2$/g, a total pore volume of at least 0.55 ml/g, and a pore size distribution for inhibiting sediment formation and promoting asphaltene removal, such that at least 50% of the total pore volume in pores with a diameter of at least 20 nm (200 Å), 10-30% of the total pore volume in pores with a diameter of at least 200 nm (2000 Å), less than 85% of the total pore volume in pores with a diameter of 10-120 nm (100-1200 Å), less than 0.2 ml/g of total pore volume in pores with a diameter of 50-150 nm (500-1500 Å), and less than 25% of the total pore volume in pores with a diameter of 10 nm (100 Å) or less, and catalyst II comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of at least 100 m²/g, a total pore volume of at least 0.55 ml/g, and a pore size distribution for providing catalytic activity and inhibiting sediment, such that at least 75% of the total pore volume in pores with a diameter of 10-120 nm (100-1200 Å), 0-2% of the total pore volume in pores with a diameter of at least 400 nm (4000 Å), 0-1% of the total pore volume in pores with a diameter of at least 1000 nm (10000 Å), and less than 25% of the total pore volume in pores with a diameter of 10 nm (100 Å) or less.

2. The method of claim 1 wherein catalyst II comprises a catalyst IIa, which comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of 100-180 m²/g, a total pore volume of at least 0.55 ml/g, at least 85% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

3. The method of claim 2 wherein the carrier of catalyst IIa consists essentially of alumina.

4. The method of claim 1 wherein catalyst II comprises a catalyst IIb, which comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier comprising at least 3.5 wt. % of silica, calculated on the weight of the final catalyst, said catalyst having a specific surface area of at least 150 m²/g, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

5. The method of claim 4 wherein catalyst IIb additionally comprises a Group IA metal component.

6. The method of claim 1 wherein at least one of the stages is carried out in an ebullating bed.

7. The method of claim 1 wherein catalyst II may comprise catalyst IIa and/or catalyst IIb, catalyst IIa, which comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of 100-180 m²/g, a total pore volume of at least 0.55 ml/g, at least 85% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å), catalyst IIb, which comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier comprising at least 3.5 Wt. % of silica, calculated on the weight of the final catalyst, said catalyst having a specific surface area of at least 150 m²/g, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

8. The method of claim 7 wherein Catalyst II comprises both catalyst IIa and catalyst IIb, catalyst IIb being present in an amount of at least 1 wt. % of the total catalyst mixture.

9. The method of claim 8 wherein catalyst ha has at least 50% of its pore volume in pores with a diameter above 200 Å, and catalyst IIb has at most 50% of its pore volume in pores with a diameter above 200 Å.

10. The method of claim 8 wherein catalyst IIb comprises a Group VA metal component, in particular phosphorus.

11. A combination of catalysts comprising a catalyst I which comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of at least 100 m²/g, a total pore volume of at least 0.55 ml/g, and a pore size distribution for inhibiting sediment formation and promoting asphaltene removal, such that at least 50% of the total pore volume in pores with a diameter of at least 20 nm (200 Å), 10-30% of the total pore volume in pores with a diameter of at least 200 nm (2000 Å), less than 85% of the total pore volume in pores with a diameter of 10-120 nm (100-1200 Å), less than 0.2 ml/g of total pore volume in pores with a diameter of 50-150 nm (500-1500 Å), and less than 25% of the total pore volume in pores with a diameter of 10 nm (100 Å) or less, and a catalyst II which comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of at least 100 m²/g, a total pore volume of at least 0.55 ml/g, and a pore size distribution for providing catalytic activity and inhibiting sediment, such that at least 75% of the total pore volume in pores with a diameter of 10-120 nm (100-1200 Å), 0-2% of the total pore volume in pores with a diameter of at least 400 nm (4000 Å), 0-1% of the total pore volume in pores with a diameter of at least 1000 nm (10000 Å), and less than 25% of the total pore volume in pores with a diameter of 10 nm (100 Å) or less.

12. The catalyst combination of claim 11 wherein catalyst II comprises a catalyst IIa, which comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of 100-180 m²/g, a total pore volume of at least 0.55 ml/g, at least 85% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

13. The catalyst combination of claim 12 wherein the carrier of catalyst IIa consists essentially of alumina.

14. The catalyst combination of claim 11 wherein catalyst II comprises a catalyst IIb, which comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier comprising at least 3.5 wt. % of silica, calculated on the weight of the final catalyst, said catalyst having a specific surface area of at least 150 m²/g, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

15. The catalyst combination of claim 11 wherein catalyst IIb additionally comprises a Group IA metal component.

16. The catalyst combination of claim 12 wherein catalyst II comprises catalyst IIa and/or catalyst IIb, wherein catalyst IIa comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of 100-180 $m^2/g$, a total pore volume of at least 0.55 ml/g, at least 85% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å), and wherein catalyst IIb, which comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier comprising at least 3.5 wt. % of silica, calculated on the weight of the final catalyst, said catalyst having a specific surface area of at least 150 $m^2/g$, a total pore volume of at least 0.55 $m^2/g$, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

17. The catalyst combination of claim 16 wherein catalyst II comprises both catalyst ha and catalyst IIb, catalyst IIb being present in an amount of at least 1 wt. % of the total catalyst mixture.

18. The catalyst combination of claim 17 wherein catalyst IIa has at least 50% of its pore volume in pores with a diameter above 200 Å, and catalyst IIB has at most 50% of its pore volume in pores with a diameter above 200 Å.

19. The catalyst combination of claim 18 wherein catalyst IIb comprises a Group VA metal component, in particular phosphorus.

\* \* \* \* \*